(12) United States Patent
Munk-Nielsen

(10) Patent No.: US 6,236,576 B1
(45) Date of Patent: May 22, 2001

(54) METHOD AND A CIRCUIT FOR RESONANCE INVERSION

(75) Inventor: Stig Munk-Nielsen, Aalborg (DK)

(73) Assignee: APC Danmark A/S, Kolding (DK)

( * ) Notice: Subject to any disclaimer, the term of this patent is extended or adjusted under 35 U.S.C. 154(b) by 0 days.

(21) Appl. No.: 09/424,047
(22) PCT Filed: May 19, 1998
(86) PCT No.: PCT/DK98/00200
§ 371 Date: Mar. 3, 2000
§ 102(e) Date: Mar. 3, 2000
(87) PCT Pub. No.: WO98/53550
PCT Pub. Date: Nov. 26, 1998

(30) Foreign Application Priority Data

May 21, 1997 (DK) .................................................. 0583/97

(51) Int. Cl.[7] .......................... H02M 3/335; H02M 7/122
(52) U.S. Cl. ............................... 363/16; 363/57; 318/722
(58) Field of Search ............................. 363/16, 37, 40, 363/41, 131, 98, 132, 57, 53; 318/722, 801, 721; 361/111

(56) References Cited

U.S. PATENT DOCUMENTS 3,940,669 * 2/1976 Tsuboi et al. .................... 318/721
4,310,866 * 1/1982 Wirth ................................ 361/88
5,111,374   5/1992 Lai et al. .
5,559,685   9/1996 Lauw et al. .

FOREIGN PATENT DOCUMENTS 42 33 573 A1   5/1993 (DE) .

* cited by examiner

*Primary Examiner*—Rajnikant S. Patel
(74) *Attorney, Agent, or Firm*—Dykema Gossett PLLC

(57) ABSTRACT

The invention related to a resonance inverter comprising a resonance circuit with at least one inductance and one capacitors, a switch circuit electrically connected to the resonance circuit comprising at least one power electronic component, as well as a control circuit for controlling each power electronic component in accordance with a given control algorithm or strategy, the control circuit being electrically connected to the switch circuit. The unique feature of the invention is that the resonance inverter additionally comprise a pulse generating circuit (12'; 15; 32', 31) having at least one control inductance (12', 32') which is inductively coupled to at least one of the inductances (12; 32) of the resonance circuit, whereby energy is transferred inductively to the resonance circuit.

7 Claims, 3 Drawing Sheets

METHOD AND A CIRCUIT FOR RESONANCE INVERSION

FIELD OF THE ART

The invention relates to a resonance inverter as defined in the introductory portion of claim 1, and to a method of maintaining an oscillation in a resonance circuit of a resonance inverter as defined in the introductory portion of claim 6.

U.S. Pat. No. 5,111,374 discloses a resonance inverter of the short-circuit type. The resonance inverter described in the patent specification comprises a voltage source or a DC bus with an associated resonance circuit, which can in turn feed or be fed by an associated switch circuit consisting of a plurality of power switches each having antiparallel-coupled diodes.

However, the above-mentioned circuit has the drawback that maintenance of a resonance oscillation in the resonance part of the circuit is complicated and inexpedient. The resonant oscillation is thus initialized and maintained by short-circuiting the resonance capacitor. First, the power switches are subjected to stress, which is particularly pronounced when an oscillation is initiated, which, other things being equal, influences the service life of the inverter. Second, the application range is restricted with respect to the achievable maximum voltage, and, third, the short-circuiting method used requires comprehensive current control of the oscillation state in the resonance circuit.

Another problem which occurs in this connection is to determine when the switches of the resonance inverter are to be turned on and off, as it is not given that a given threshold reference, e.g. 0 V across the switches, is achieved at all in the oscillation course concerned. Thus, it is extremely difficult and cumbersome to synchronize the switch control with the oscillation of the resonance circuit.

SUMMARY OF THE INVENTION

When, as stated in claim 1, the resonance inverter additionally comprises a pulse generating circuit having at least one control inductance which is inductively coupled to at least one of the inductances of the resonance circuit, it is ensured that energy may be fed to the resonance circuit from a pulse generating circuit via an inductive coupling. As a result of this, the resonance circuit may be initiated and controlled very specifically to a desired oscillation course, no matter whether start of an oscillation in the resonance circuit is desired or this is to be maintained in a simple manner.

The invention thus enables the resonance circuit to be controlled in a simple manner, thereby obviating component stress, frequent power downs and consequent restart of the circuit.

It should moreover be noted that undesired transients may be damped in an optimum manner or be avoided completely, as sudden voltage jumps because of e.g. short-circuit initiation do not occur.

It should also be noted that a control circuit for controlling the oscillation state of the resonance circuit may be simplified considerably, as an oscillation in the resonance circuit may be made self-regulating so to speak.

Thus, according to the invention it is possible to avoid the situation that oscillations in the resonance circuit cease completely because the oscillation does not get down to 0 V in its lower oscillation state.

It should moreover be noted that the very simple control of the resonance circuit provides a very predictable and uniform reproducible output of the resonance circuit, and the control algorithm for the switch circuit may therefore be simplified. One of the reasons of this is that zero crossings on the output of the resonance circuit provide a very simple basis for detection and control.

Additionally, the invention allows the control circuit to be insulated galvanically from the resonance circuit itself in the inverter.

When the pulse generating circuit is coupled inductively to the resonance circuit, it is additionally ensured that the physical properties of the resonance circuit may control the pulse generation, e.g. by allowing the generation of pulses to be dependent on the sign of the voltage of the inductance in the oscillation circuit.

Thus, according to the invention it is possible to achieve a very high efficiency, as the resonance circuit may optimally be applied such that the switches in the switch circuit have minimum oscillation losses, as on-off switching may be performed at optimally 0 V, just as a minimum dv/dt for each switch may be obtained.

The invention thus makes it possible to compensate for ohmic losses in the resonance circuit by inductively feeding energy to the resonance circuit.

According to the invention it is also possible to carry out a "soft" start of the resonance oscillation of the circuit, so that the desired resonance oscillation is achieved after a reasonable period of time without unpleasant transients or overshoot, just as it is possible to maintain the oscillation with a minimum feed of energy.

It should moreover be noted that, in principle, the resonance inverter may be arranged to be bidirectinal.

Power electronic components may e.g. be formed by bipolar transistors, GTO's, IGTB's or the like.

When, as stated in claim 2, the power electronic components of the resonance inverter are antiparallel-coupled to at least one diode, a particularly advantageous embodiment of the invention is achieved, as the antiparallel-coupled diodes advantageously impart bidirectional properties to the system.

When, as stated in claim 3, the circuit additionally comprises a switch circuit having at least one power electronic component, said switch circuit being electrically connected to the resonance circuit of the resonance inverter so that the resonance circuit is connected to at least two switch circuits, said resonance circuit also comprising at least one DC collecting capacitance, an AC-DC-AC converter is achieved, capable of bidirectionally connecting two AC networks or generators via the DC collecting capacitance in a manner known per se.

Thus, according to the invention it is possible to achieve a transient-free or approximately transient-free and dynamic coupling between two AC networks with minimum power losses.

If a bidirectional connection between each AC side is desired, it will be appreciated that the individual switches in the switch circuits must be bidirectional.

When, as stated in claim 4, the frequency generating circuit comprises means for detecting the sign of the voltage on either a control inductance and/or at least one of the inductances of the resonance circuit, said frequency generating circuit comprising means for generating current pulses in at least one control inductance so that current and voltage in the control inductance or inductances are completely or partly in in-phase, it is possible to initiate, control and maintain oscillations in the resonance circuit in a simple manner, as the natural oscillation property of the resonance circuit and especially the actual oscillation state of the resonance circuit determine the transient via the inductive coupling between the inductance of the resonance circuit and the inductance of the pulse generating circuit.

The decisive thing is thus that energy is transferred from the pulse generating circuit to the resonance circuit in at least a part of the oscillation period.

When the pulse generating circuit emits current in dependence on the phase of the voltage across one of the above-mentioned inductances, a combined double feedforward and feedback between the pulse generating circuit and the resonance circuit is thus obtained.

It should additionally be noted that, according to the present embodiment, it is extremely simple to construct the means for detecting the sign of the voltage on the control inductance, since this may be made in a simple manner by means of a single comparator which is coupled to the windings of the control inductance.

It should moreover be noted that the present embodiment is extremely simple and elegant when it is constructed exclusively galvanically insulated from the resonance circuit, since this may be made in low power electronics which is loaded only by low voltage.

In certain circuits, it will be preferred according to the invention that an in-phase current is fed in the control inductance at a positive voltage, while no current is fed when the voltage is negative across the control inductance, thereby ensuring that practically the entire energy transfer takes place from the control inductance to the resonance inductance.

When, as stated in claim 5, the resonance inverter comprises means for detecting that the voltage on the output of the resonance circuit is zero or approximately zero, said means being electrically connected to the control circuit, said control circuit being adapted just to emit on/off control signals to the switch circuit when the detecting means have detected that the voltage is zero or approximately zero, an advantageous embodiment of the invention is achieved, since control of the switch circuit may be synchronized in a simple manner with the oscillations of the resonance circuit.

Here, too, it should be noted that the detection and control circuit may be constructed in a very simple manner since the oscillation states in the resonance circuit are very predictable and uniform, so that a simple zero crossing on the output of the resonance circuit will frequently be a sufficient input parameter for a control circuit which may then subsequently turn the individual switches on and off.

It will be appreciated that the control signals are not necessarily emitted each time zero voltage is detected on the output of the resonance circuit.

It should also be noted that, according to the invention, it is possible to detect a zero crossing via the inductive coupling between the control inductance and the resonance inductance, which is unique in itself since the zero crossing in the high voltage part of the resonance circuit may thus be deduced from a current detection on the control inductance and knowledge of the resonance circuit. This additionally simplifies the complete system, which enables a more sturdy and also more inexpensive design of an inverter, since all the detection circuits may be provided on the primary side or more particularly the low voltage side of the inductive coupling between the resonance circuit and the frequency generating circuit.

When, as stated in claim 6, energy is transferred to the resonance circuit via an inductive coupling with at least one of the inductances of the resonance circuit, an advantageous control and maintenance of the resonance oscillation in the resonance circuit is achieved.

When, as stated in claim 7, the energy transferred to the inductances of the resonance circuit substantially corresponds to the ohmic loss of the resonance circuit, a particularly advantageous embodiment of the invention is achieved, as the invention enables specific feeding of the energy which is actually necessary to maintain an oscillation in the resonance circuit.

In many connections in practice it will be necessary or advantageous to feed an energy which is greater than the energy that corresponds to the ohmic loss.

DRAWING

The invention will be described more fully below with reference to the drawing, in which FIG. 1 shows an explanatory sketch of a DC-AC resonance inverter according to the invention, FIG. 2 shows a further embodiment of the invention in the form of an AC-DC-AC resonance inverter, FIG. 3 shows a more detailed structure of a DC-AC resonance converter according to the invention, and FIGS. 4a & 4b shows the transient of a resonance converter corresponding to the one shown in FIG. 3, according to the invention.

EXAMPLE

FIG. 1 shows an explanatory sketch of an embodiment according to the invention.

The shown embodiment is a DC-AC resonance inverter having a three-phase output.

The resonance inverter is formed by a DC voltage source 10 whose one terminal is connected to earth 11, while the other terminal is connected to the input of a resonance circuit which is formed by an inductance 12 connected in series to a resistor 13, which is connected to earth 11 via a resonance capacitor 14.

The resonance circuit in the shown inverter is thus formed by the inductance 12 and the capacitor 14 connected thereto, while the resistor 13 forms the attenuation in the circuit.

The gate A of the resonance circuit is connected to a switch circuit consisting of six IGBT's 21–26, as well as associated antiparallel-coupled diodes 21'–26'. It should be pointed out in this connection that many other types of power switches may be used, just as the shown circuit may be constructed in a known manner with any desired phase number.

All the IGBT's 21–26 of the switch circuit are connected to a control circuit (not shown), which turns the individual IGBT's on and off according to a given control algorithm. However, it will be appreciated that the switches 21–26 of the switch circuit are desirably turned on and off when there is no voltage across these, so that power loss and component stress are avoided.

The shown resonance inverter additionally has three outputs 16, 17 and 18 which may be connected externally, as desired.

The inductance 12 is finally inductively connected to a pulse generating circuit via an inductance 12' which is fed by a pulse generating generator 15.

The shown example may e.g. be a control for the generation of control pulses for an induction motor.

The function of the above circuit is thus that the voltage source 10 provides a given DC voltage which, via the resonance circuit consisting of the inductance 12, the resistance 13 and the capacitance 14, is converted into an AC voltage with a frequency corresponding to the resonance frequency of the oscillation circuit and an offset corresponding to the DC voltage.

Subsequently, the switch circuit cuts the AC voltage on the gate A into a three-phase pulsating voltage on the outputs 16, 17 and 18 in dependence on the control circuit (not shown).

As mentioned above, the switches 21–26 of the switch circuit will desirably be turned on and off when there is no voltage across these, thereby obviating power loss and component stress. It should be pointed out that this control is particularly simple according to the invention as the AC oscillations on the gate A are extremely well-defined according to the invention, and the switching times may therefore be determined optimally in a simple manner without complicated and expensive measuring circuits, just as it is possible according to the invention to switch without loss in the switches 21–26 since, ideally, the AC voltages may be provided with the voltage 0 V with the well-defined period time which is determined by the natural frequency of the resonance circuit.

It is also noted that, according to the invention, it is possible to obtain galvanic separation between the pulse generating circuit and the resonance circuit in general, and considerable advantages are therefore achieved in terms of component selection, component stress, component service life and dimensioning in general.

FIG. 2 shows a further embodiment according to the invention.

The shown embodiment is a three-phase AC to three-phase AC converter, or more particularly a parallel resonance DC link converter.

The inverter of the invention comprises three stages 100, 200 and 300.

The first stage 100 of the inverter is formed by a set of rectifier switches 44, 44'; 45, 45'; 46, 46' with associated antiparallel-coupled diodes which may e.g. be formed by bipolar transistors. These are connected to an AC network via the connections 47, 48 and 49 via inductances 47', 48' and 49'.

The second stage 200 of the inverter comprises a resonance circuit with a resonance capacitance 34 which is parallel-coupled to a series coupling of the resonance inductance 32 and an intermediate circuit capacitance 30. The resonance circuit is thus parallel-coupled to the first stage 100 of the inverter.

The resonance capacitance 34 and the resonance inductance 32 define the resonance frequency of the resonance circuit in a known manner, i.e. the frequency into which the resonance circuit converts the DC voltage applied from stage 1.

The intermediate circuit capacitance 30 serves as the DC component of the second stage 200, since this together with the antiparallel-coupled diodes in the first 100 and third 300 stages of the circuit accommodates a charge from the diodes when these conduct.

The third stage 300 of the inverter is formed by a set of switches 41, 41'; 42, 42'; 43, 43' with associated antiparallel-coupled diodes which may e.g. be formed by bipolar transistors. These are connected to e.g. a three-phase motor with inductances 36', 37' and 38' via connections 36, 37 and 38.

When current runs from the second stage 200 toward the third stage 300, the capacitance 30 in the second stage thus supplies a charge on the connections 36, 37 and 38, which is modulated by the switches in the third stage. In this case, as mentioned above, the capacitance 30 is fed by the connections 47, 48 and 49 via the inductances 47', 48' and 49' and the antiparallel-coupled diodes as well as the switches 44, 44', 45, 45', 46 and 46' like a conventional active rectifier circuit.

When current runs from the second stage 200 toward the first stage 100, the capacitance 30 in the second stage thus supplies a charge on the connections 47, 48 and 49. In this case, the capacitance 30 is fed by the connections 36, 37 and 38 via the inductances 36', 37' and 38' (which may e.g. be a three-phase inductance motor) and the antiparallel-coupled diodes as well as the switches 41, 41', 42, 42', 43 and 43' like a conventional inverter circuit.

It will be appreciated that the above-mentioned current course in the switches is controlled actively in a known manner by means of the switches incorporated in the switch circuit.

Thus, it appears from the foregoing that the shown parallel resonance link is bidirectional.

The resonance inductance 32 is inductively coupled to an inductance 32' which together with a current source 31 forms a closed resonance control circuit 200'. It will thus be appreciated that the actual resonance circuit or the second stage 200 is galvanically separated from the resonance control circuit 200'. The current source 31 may be constructed in a simple manner so that this can initiate, control and maintain the resonance oscillation in the second stage via an inductive energy transfer from a low voltage circuit to a circuit with rather high voltages and currents.

The resonance oscillation of the resonance circuit in the second stage 200 is thus fed by the intermediate circuit capacitance 30, the AC oscillations of the resonance circuit being initialized and maintained.

FIG. 3 shows a more detailed structure of a DC-AC resonance converter according to the invention.

The basic form of the DC-AC converter is as illustrated in FIG. 1.

The resonance inverter is formed by a DC voltage source 60 whose one terminal is connected to earth 61, while the other terminal is connected to the input of a resonance circuit whch is formed by an inductance 62 connected in series to a resistor 64 which is connected to earth 61 via a resonance capacitor 64.

The inductance 62 e.g. has the value 150 $\mu$H, while the capacitance 64 has the value 100 nF.

The resonance circuit in the shown inverter is thus formed by the inductance 62 and the capacitor 64 connected thereto, while the resistor 63 constitutes ohmic losses in the oscillation circuit.

The gate A of the resonance circuit is moreover connected to a switch circuit consisting of six IGBT's 81–86 as well as associated antiparallel-coupled diodes 81'–86'. It should be pointed out in this connection that many other types of power switches may be used, just as the shown circuit may be made in a known manner with any desired phase number.

All the IGBT's 81–86 of the switch circuit are connected to a control circuit (not shown) which turn the individual IGBT's on and off according to a given control algorithm. However, it will be appreciated that the switches 81–86 of the switch circuit are desirably turned on and off when there is no voltage across these, thereby obviating power loss and component stress.

The shown resonance circuit additionally has three outputs 66, 67 and 68 which are connected to a three-phase inductance motor.

The inductance 62 is finally inductively connected to a pulse generating circuit via an inductance 62' which is fed by a pulse generating generator 101.

The shown example may e.g. be a control for the generation of control pulses for an induction motor.

The pulse generating circuit, which feeds the inductance 62', is constructed as follows.

The inductance 62', which is to feed inductive energy to the inductance 62 of the resonance circuit, is connected in series to an inductance 102 which represents the dispersion inductance in the mutual coupling between 62 and 62'.

The terminals of the inductances 102 and 62' are moreover connected to input resistances 105 and 108, respectively, for a comparator 109.

The inputs of the comparator are earthed via a capacitor 103 and a resistor 104 as well as a capacitor 106 and a resistor 107, respectively.

The comparator 109 may be of the type LM 311, the capacitors 103 and 106 may assume the value 1 nF, the resistances 104 and 107 may assume the value 1 kΩ, while the input resistors 105, 108 may assume the value 50 kΩ.

The output of the comparator may assume the value 0 V or 5 V, depending on the sign of the input voltage. The value 5 V is thus assumed at a positive voltage across the inductances 102 and 62', and the value 0 V is assumed at a negative voltage across the same.

The output of the comparator 109 is subsequently fed to a NAND gate 110 whose output is electrically connected to an additional NAND gate 111 and to a control input 112' of a switch 112 via a digital signal transformer 121.

The output from the additional NAND gate 111 is electrically connected to a control input 113' of an additional switch 113 via a digital signal transformer 120.

The NAND circuits may e.g. be of the Texas 74 132 type.

The digital signal transformers may e.g. be of the TLP 250 (Toshiba) type and have the function that the voltage of the input signal is transformed to a higher voltage, e.g. about 15 V in the present application.

The input of the switch 113 is partly connected to one terminal of a current source 101 and partly connected to the input resistor 108 of the comparator via a compensation resistor 114.

The function of the compensation resistor 114 is to compensate for the parasite capacitance in the transformer.

The output of the switch 113 is connected partly to the other terminal of the current generator 101 and partly to the output terminal of the signal transformer 112.

The input terminal of the switch 112 is additionally connected electrically to the input resistance 105 of the comparator 109 as well as the dispersion inductance 102.

The above circuits will thus feed a current in the inductance 62' as a function of the sign detection performed by the comparator 109 and the inductances 62' and 102.

The shown circuit is arranged such that a negative voltage across the inductance 62' (which is induced from the inductance 62 in the resonance circuit of the inverter) causes the current fed in the inductance 62' to be zero or approximately so, and energy is therefore not transferred between the inductances 62' and 62.

A positive voltage cross the inductance 62' (which is likewise induced from the inductance 62 in the resonance circuit of the inverter) causes a positive current pulse to be fed to the inductance 62', and energy is therefore transferred from the inductances 62' to 62. This current pulse is interrupted when a negative voltage again exists across the inductance 62'.

It will thus be seen that a suitable structure of a pulse generating circuit according to the invention, depending on the oscillation of the resonance circuit, has the result that energy (inductive energy) is primarily transferred from the pulse generating circuit to the resonance circuit, i.e. energy is transferred from 62' to 62.

In practice, it will thus be possible to provide sufficient compensation energy from the pulse generating low power circuit to the high power circuit of the resonance circuit.

This compensation energy is thus transferred to achieve a very high overall efficiency, the circuit being suitably arranged to transfer just sufficient energy, for which reason no energy is to be used for sudden activation of circuit components resulting in component stress and a high power consumption.

In addition, it is possible in practice to initiate an oscillation by means of the shown low power circuit without using sudden interventions in the oscillation state of the resonance circuit, as a small oscillation can increase to a stable oscillation state in a very short time, e.g. 1 ms. This is illustrated in FIG. 4. It is thus sufficient to feed a small imbalance signal in the frequency generating circuit to initiate a beginning oscillation state, which is gradually excited upwards for each natural oscillation which is carried out, since the current generator, as mentioned above, adds a small, but sufficient energy to the resonance circuit from the current generator 101 via the inductance 62' when the voltage across it, and thereby the inductance 62, is positive.

It should also be noted that the pulse generating circuit is galvanically separated from the resonance circuit.

FIG. 4b shows the voltage across the capacitor 64 of the resonance circuit.

An oscillation is excited because of a small introduced imbalance in the pulse generating circuit at the time t=0, following which energy is gradually fed to the oscillation from the pulse generating circuit. The oscillation will then gradually approach a Vpp value of 1 kV, which is achieved already after about 1 ms.

The lower voltage peak will gradually approach 0 V. When the lower peak has reached 0 V, the antiparallel-coupled diodes 81'–86' will begin to conduct, and then a state of equilibrium will be assumed in which the resonant oscillation in the resonance circuit will just be maintained, again with a minimum feed of energy from the pulse generating circuit.

Figure 1:
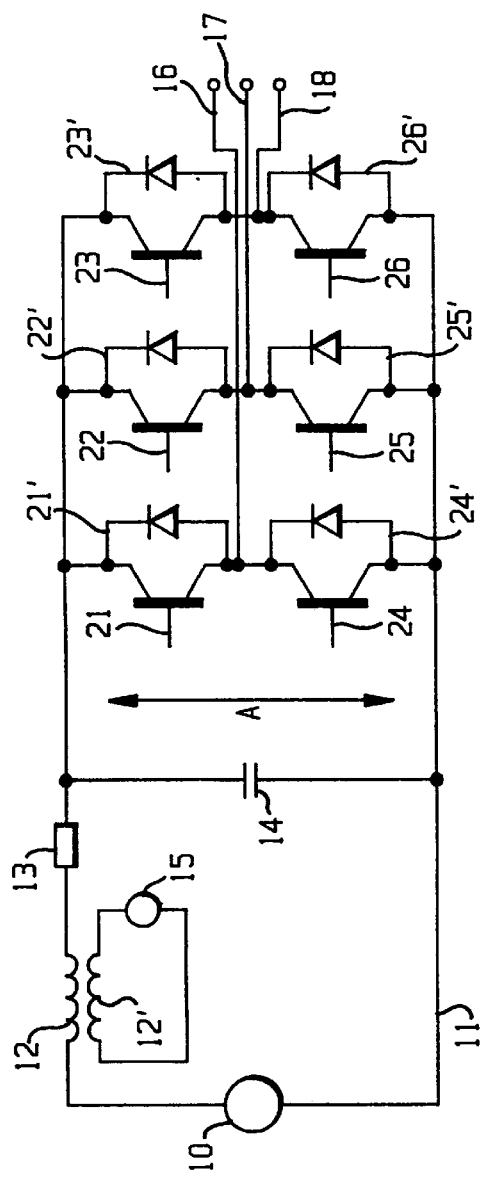
Figure 2:
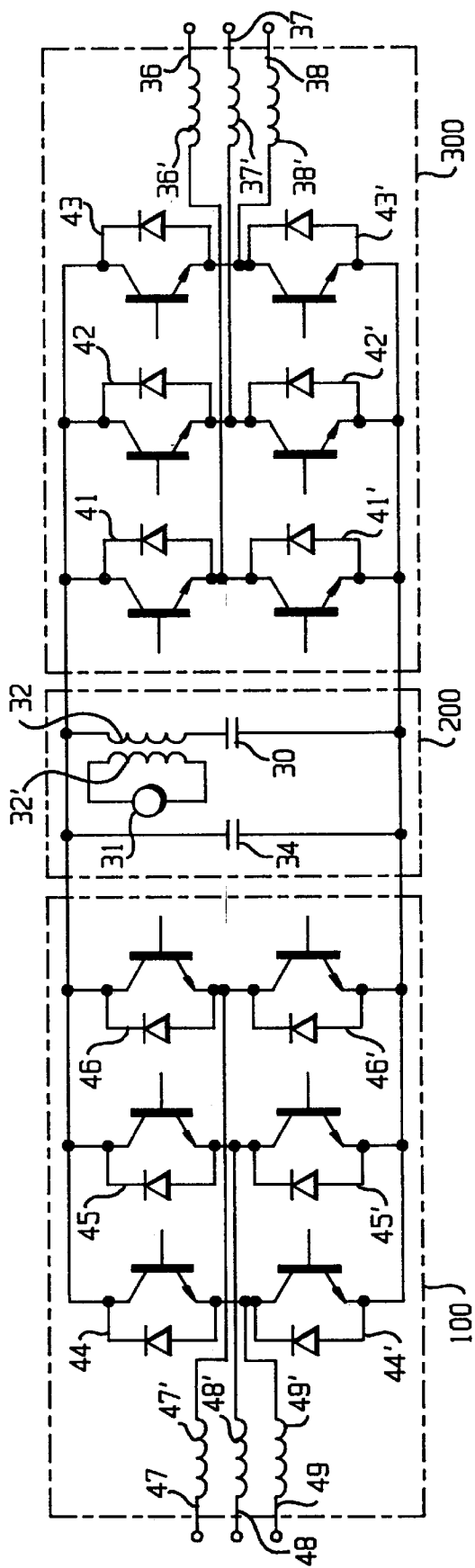
Figure 3:
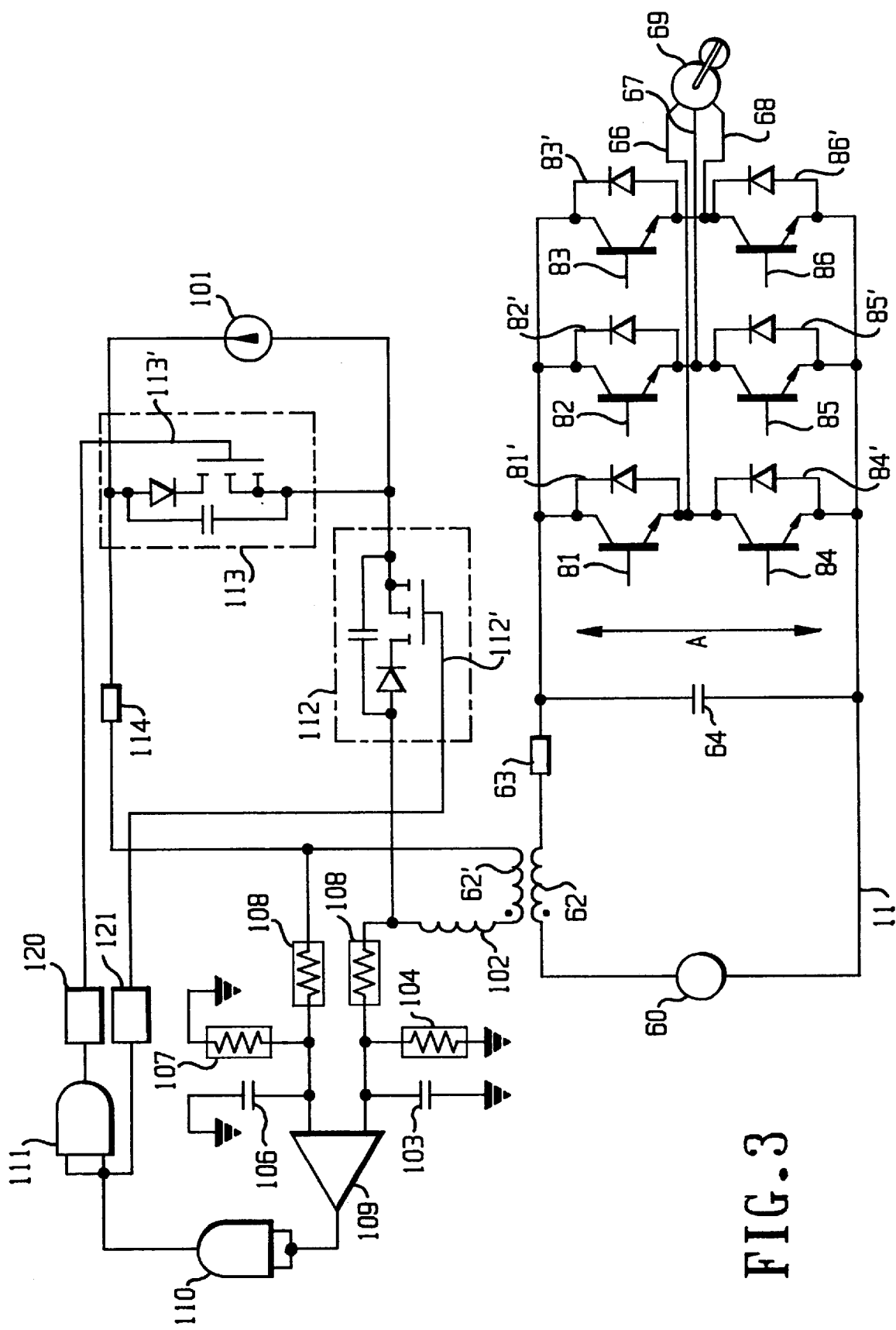
Figure 4A:
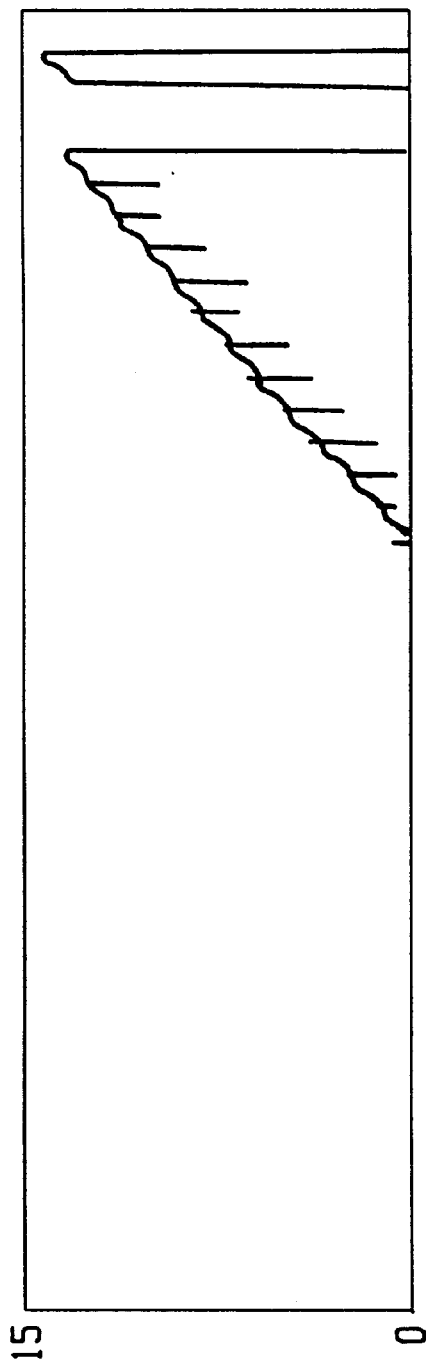
FIGS. 4a and 4b show the transient for a resonance converter corresponding to the one shown in FIG. 3, according to the invention.
Figure 4B:
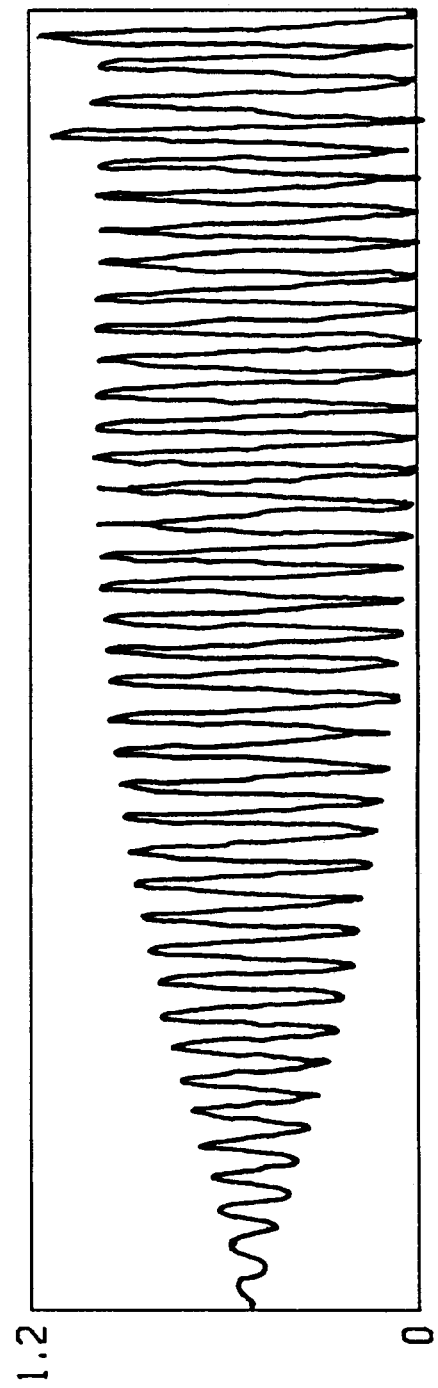

FIG. 4a shows the corresponding course of the current through the switches, as this increases gradually from 0 A to about 13–15 A in the period from about 0.6 ms to 1.0 ms.

The control of the switches is performed according to a suitable algorithm and when it has been detected that the voltage across of the resonance capacitor 64 is zero, it being ensured that no voltage jumps occur when these switches are activated.

It should be stressed that the present invention is not limited to the example shown, just as it will be appreciated that the invention may be incorporated in or be built together with existing structures or features. An example of such a feature is that, within the scope of the invention, e.g. an active or passive clamping as described in the U.S. Pat. No. 4,864,483 may be implemented in the resonance inverter.

What is claimed is:

1. A resonance inverter comprising:
   a resonance circuit including at least one inductance and one capacitor;
   a switch circuit electrically connected to the resonance circuit comprising at least one power electronic component;
   a control circuit for controlling each power electronic component in accordance with a given control algorithm or strategy, said control circuit being electrically connected to the switch circuit; and
   a pulse generating circuit including at least one control inductance inductively coupled to at least one of the inductances of the resonance circuit.

2. A resonance inverter according to claim 1, including at least one diode and wherein the power electronic switching components are antiparallel-coupled to said at least one diode.

3. A resonance inverter according to claim 1 further comprising a switch circuit including at least one power electronic component, said switch circuit being electrically connected to the resonance circuit so that the resonance circuit is connected to at least two of said switch circuits, said resonance circuit further comprising at least one DC collection capacitance.

4. A resonance inverter according to claim 3, wherein the pulse generating circuit comprises means for detecting the sign of the voltage on either a control inductance and at least one of the inductances, said pulse generating circuit comprising means for generating current pulses in at least one said control inductance so that current and voltage are at least partly in in-phase.

5. A resonance inverter according to claim 3 further comprising means for detecting that the voltage on the output of the resonance circuit is at least approximately zero, said means being electrically connected to the control circuit, said control circuit being adapted to emit on control signals to the switch circuit when the detecting means have detected that the voltage is approximately zero.

6. A method of maintaining an oscillation in a response circuit of a resonance inverter wherein energy is transferred to the resonance circuit via an inductive coupling with at least one of the inductances of the resonance circuit.

7. A method according to claim 6, wherein the energy transferred to the inductances of the resonance circuit substantially corresponds to the ohmic loss of the resonance circuit.

* * * * *